(No Model.)
J. P. KNOBELOCH.
MEANS FOR ATTACHING SPRINGS.
No. 273,695. Patented Mar. 6, 1883.
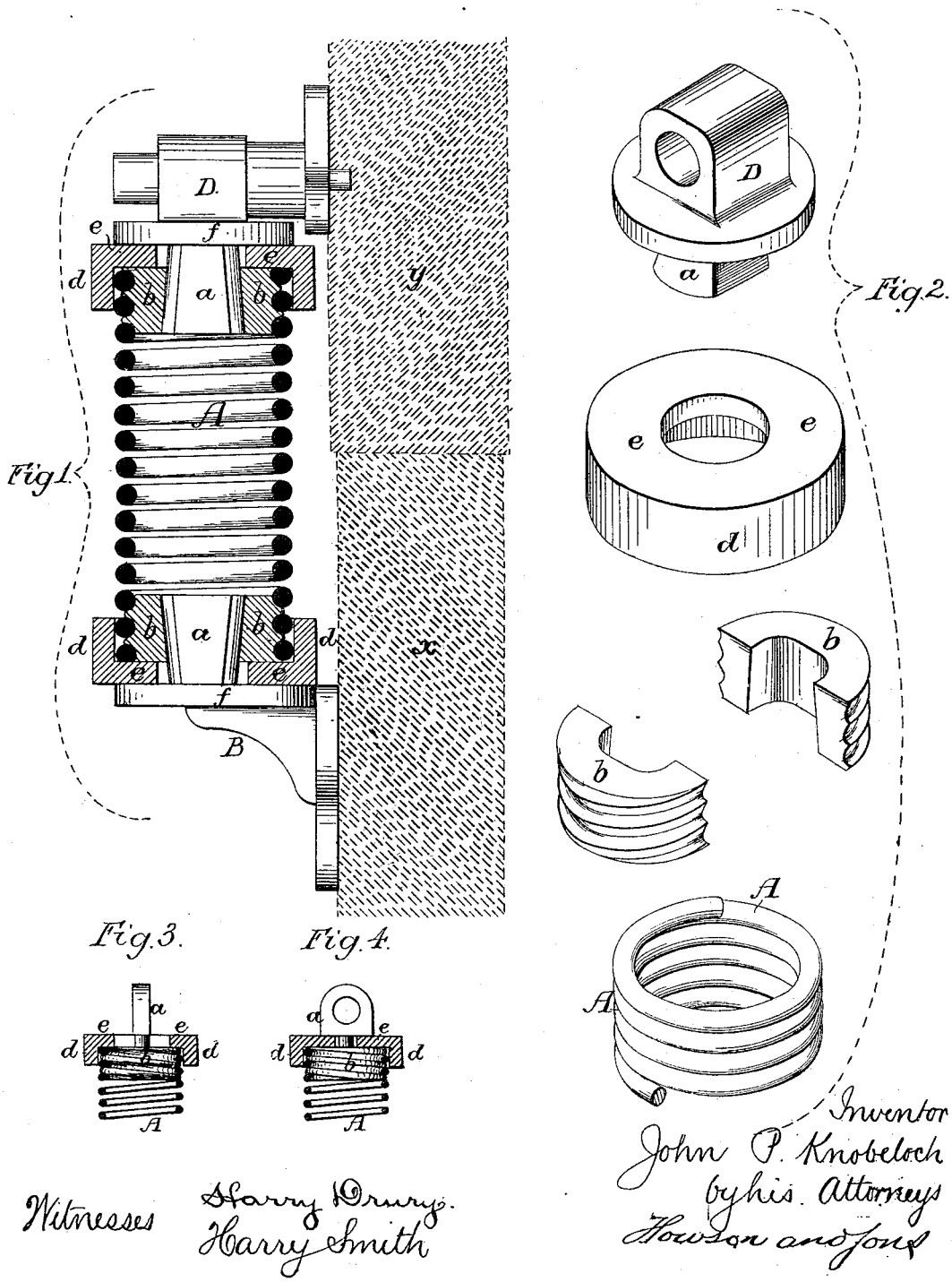

UNITED STATES PATENT OFFICE.

JOHN P. KNOBELOCH, OF PHILADELPHIA, PENNSYLVANIA.

MEANS FOR ATTACHING SPRINGS.

SPECIFICATION forming part of Letters Patent No. 273,695, dated March 6, 1883.

Application filed July 10, 1882. (No model.)

*To all whom it may concern:*

Be it known that I, JOHN P. KNOBELOCH, a citizen of the United States, and a resident of Philadelphia, Pennsylvania, have invented certain Improvements in Means for Attaching Springs, of which the following is a specification.

The object of my invention is to readily and securely attach a stem to the end of a coiled spring, and this object I attain in the manner which I will now proceed to describe, reference being had to the accompanying drawings, in which—

Figure 1 is a sectional view of a spring and connections constructed in accordance with my invention; Fig. 2, a perspective view of the parts of one connection detached from each other; and Figs. 3 and 4, sectional views of a modified form of the device.

In Fig. 1, A represents a coiled spring, which it is desired to connect at the lower end to the base $x$ of a chair, and at the upper end to a portion of the side frame, $y$, of the same, said side frame having a segmental lower edge adapted to ways on the base, and the spring serving to hold the two parts together. This structure is old in itself, and forms no part of my invention, but is selected simply to show one application of the latter, the invention not being limited thereto. For instance, the spring A, instead of being a contraction-spring, may be a torsion-spring, and may be connected at one end to a door and at the opposite end to a door-frame. At each end of the spring is a stem, $a$, that at the lower end of the spring forming part of a bracket, B, secured to the base $x$, and that at the upper end of the spring forming part of an eye, D, adapted to a pin on the chair-frame $y$. That portion of each stem which projects beyond the spring will be constructed as may be suggested by the character of the attachment to be made.

My invention relates to the method of securing the stems $a$ to the spring. As shown in Figs. 1 and 2, the stems are wedge-shaped, and are adapted to receive externally-threaded two-part nuts $b$, to the threads of which are adapted the coils at and near the ends of the spring, the coils when screwed onto the nuts serving to confine the parts of the latter firmly to the stems $a$.

To prevent the expansion of the coils or the spreading of the nuts to such an extent as to permit the coils to be pulled from the nuts or the latter from the stems, I employ rings $d$, which snugly embrace the coils at and near each end of the spring, and are retained in place by means of internal flanges, $e$, confined between the nuts $b$ and plates $f$ on the stems.

It should be understood that the spring A is applied to the stems $a$ before the latter are secured to the object to which the spring is to be attached or when one only of them has been so secured.

Various modifications of the above-described device within the scope of my invention will readily suggest themselves to those skilled in the art to which the invention relates. For instance, the stems $a$ may be T-shaped or otherwise undercut, instead of being simple wedges, and the nuts may be made in three or more sections, instead of two; or, on the contrary, the nuts may in some cases form part of the stem, as shown in Figs. 3 and 4.

Instead of using a flange on the ring $d$ to secure the same in place, said ring may be secured by soldering or otherwise.

I have shown my improved connection at both ends of the spring; but it may be used at one end only, if desired.

I claim as my invention—

1. The combination of a spring, a nut grooved or threaded for the reception of the end coils of the spring, a projecting stem to which said nut is secured, and an external ring fitted to the end coils of the spring, and serving to prevent the same from slipping off of the grooved or threaded nut, as set forth.

2. The combination of a spring, an undercut stem, $a$, a sectional nut, $b$, embracing the stem, and threaded externally for the reception of the coils of the spring, and an outer ring, $d$, fitted to the spring to prevent spreading of the same, as set forth.

3. The combination of the spring, the wedge-shaped stem $a$, the sectional nut embracing the stem, and threaded externally for the reception of the end coils of the spring, and the outer ring, d, fitted to the spring to prevent the spreading of the same, as set forth.

4. The combination of the spring, the stem a, the sectional nut b, embracing the same, and threaded externally for the reception of the end coils of the spring, and an outer confining-ring, d, having an internally-projecting flange, e, as set forth.

In testimony whereof I have signed my name to this specification in the presence of two subscribing witnesses.

JOHN P. KNOBELOCH.

Witnesses:
ED. EMERICK SELL,
HARRY SMITH.